June 4, 1929. L. D. NELSON Re. 17,316
FILLING MACHINE
Original Filed March 20, 1924 6 Sheets-Sheet 1
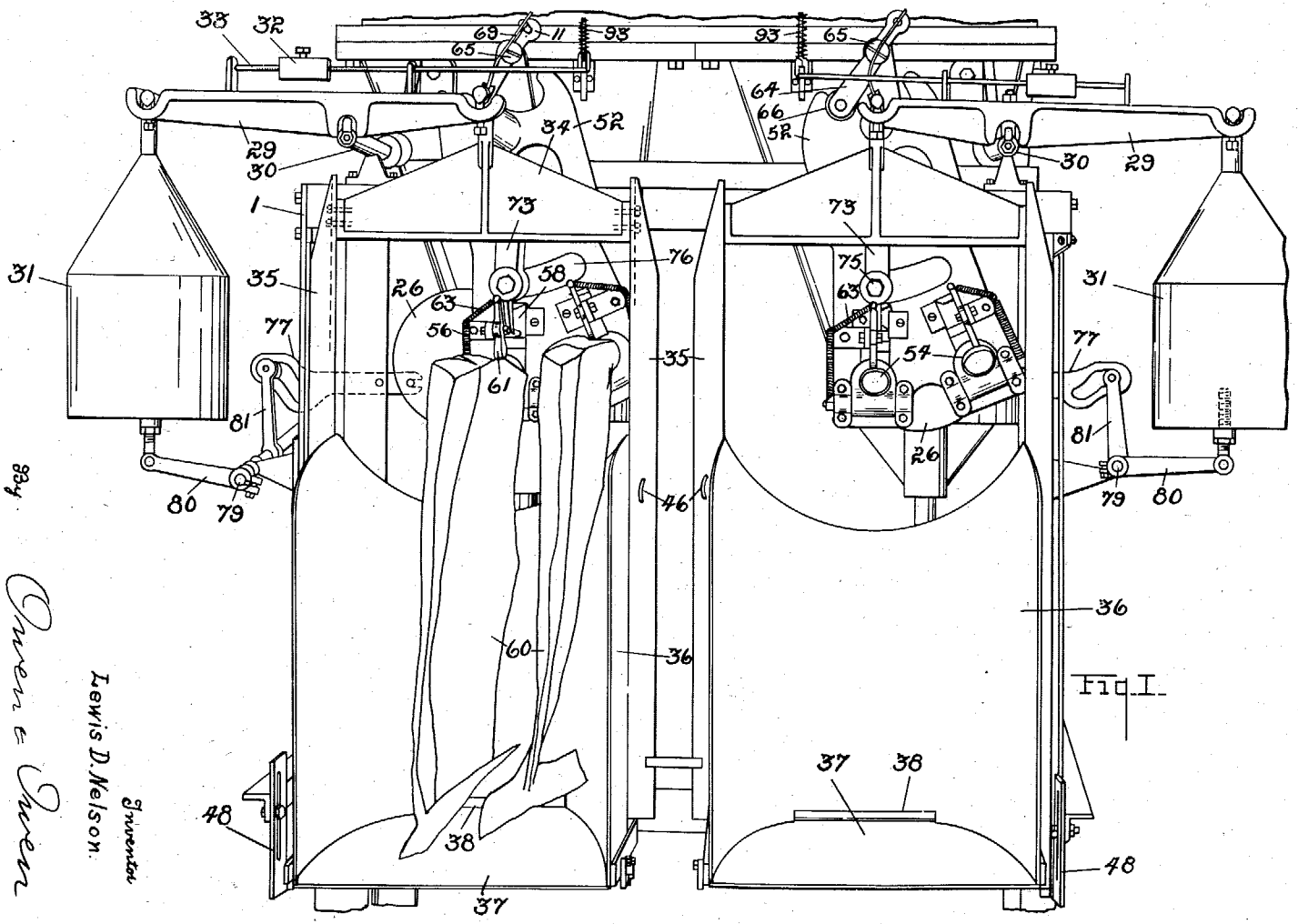
Inventor
Lewis D. Nelson.
By Owen & Owen
Attorneys.

June 4, 1929. L. D. NELSON Re. 17,316
FILLING MACHINE
Original Filed March 20, 1924 6 Sheets-Sheet 2
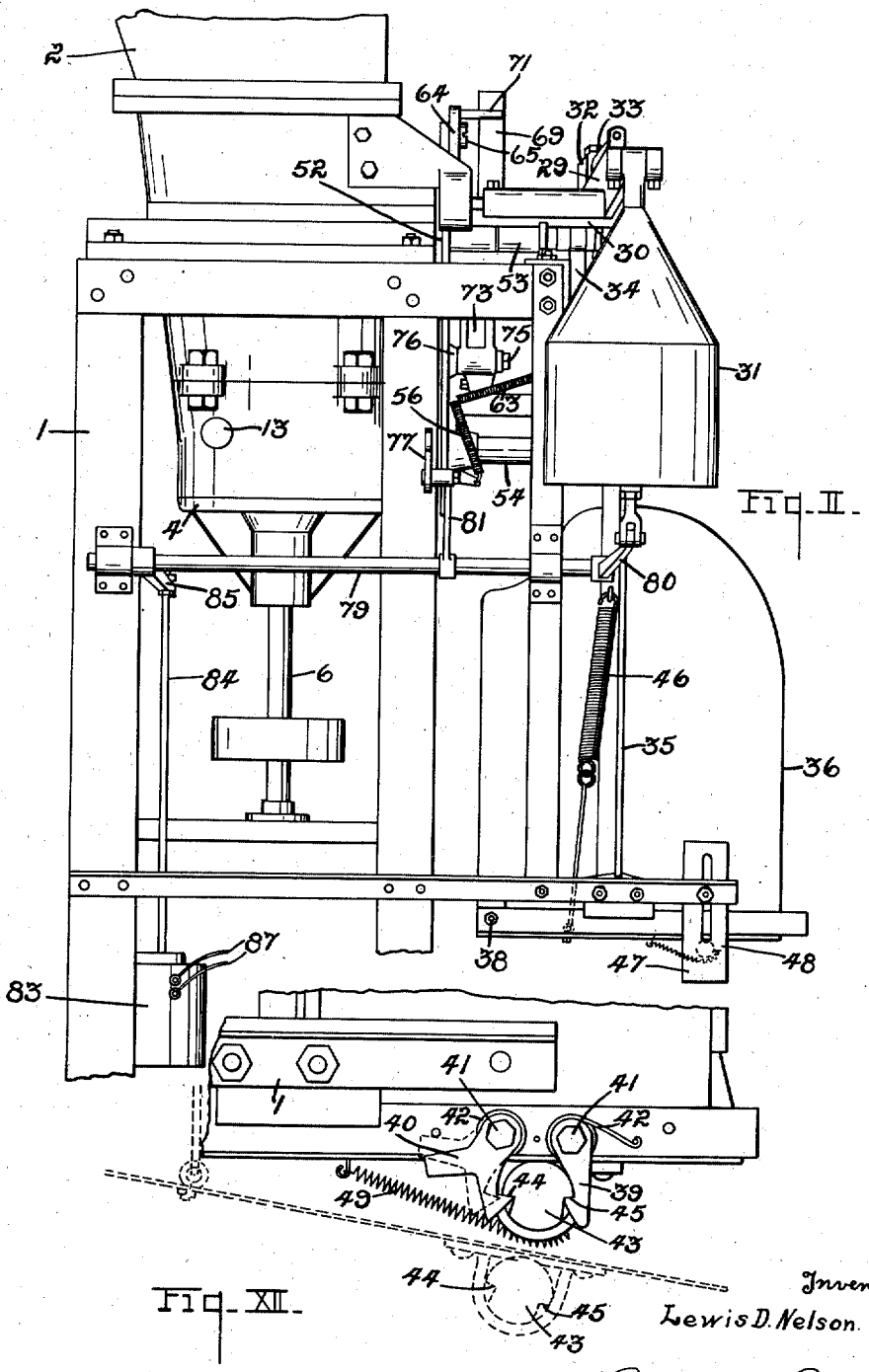
Fig. II.
Fig. XII.
Inventor
Lewis D. Nelson.
By Owen & Owen
Attorneys.

June 4, 1929. L. D. NELSON Re. 17,316
FILLING MACHINE
Original Filed March 20, 1924 6 Sheets-Sheet 3
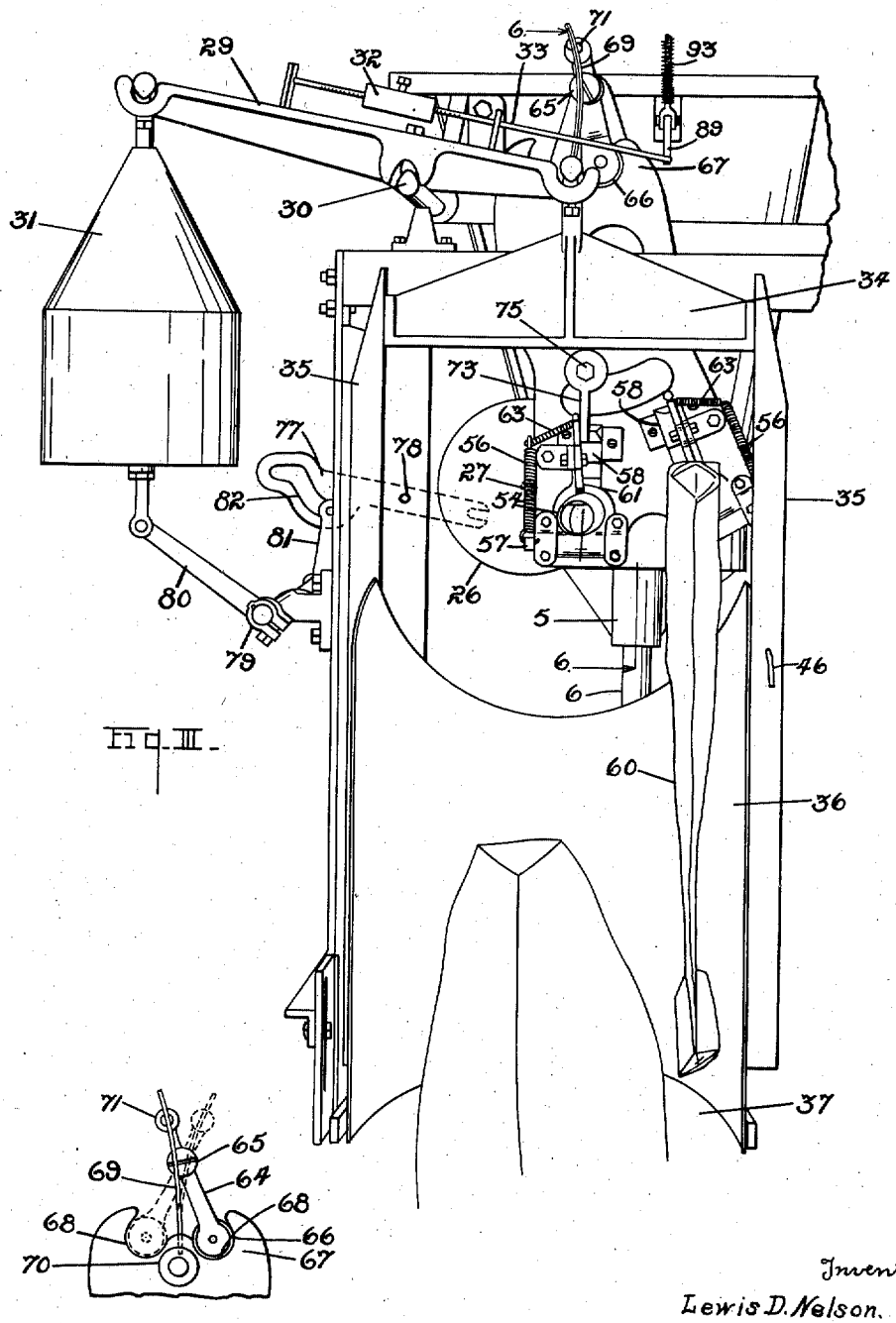
Fig. III.
Fig. XIII.
Inventor,
Lewis D. Nelson.
By Owen & Owen
Attorneys.

June 4, 1929. L. D. NELSON Re. 17,316
FILLING MACHINE
Original Filed March 20, 1924 6 Sheets-Sheet 4
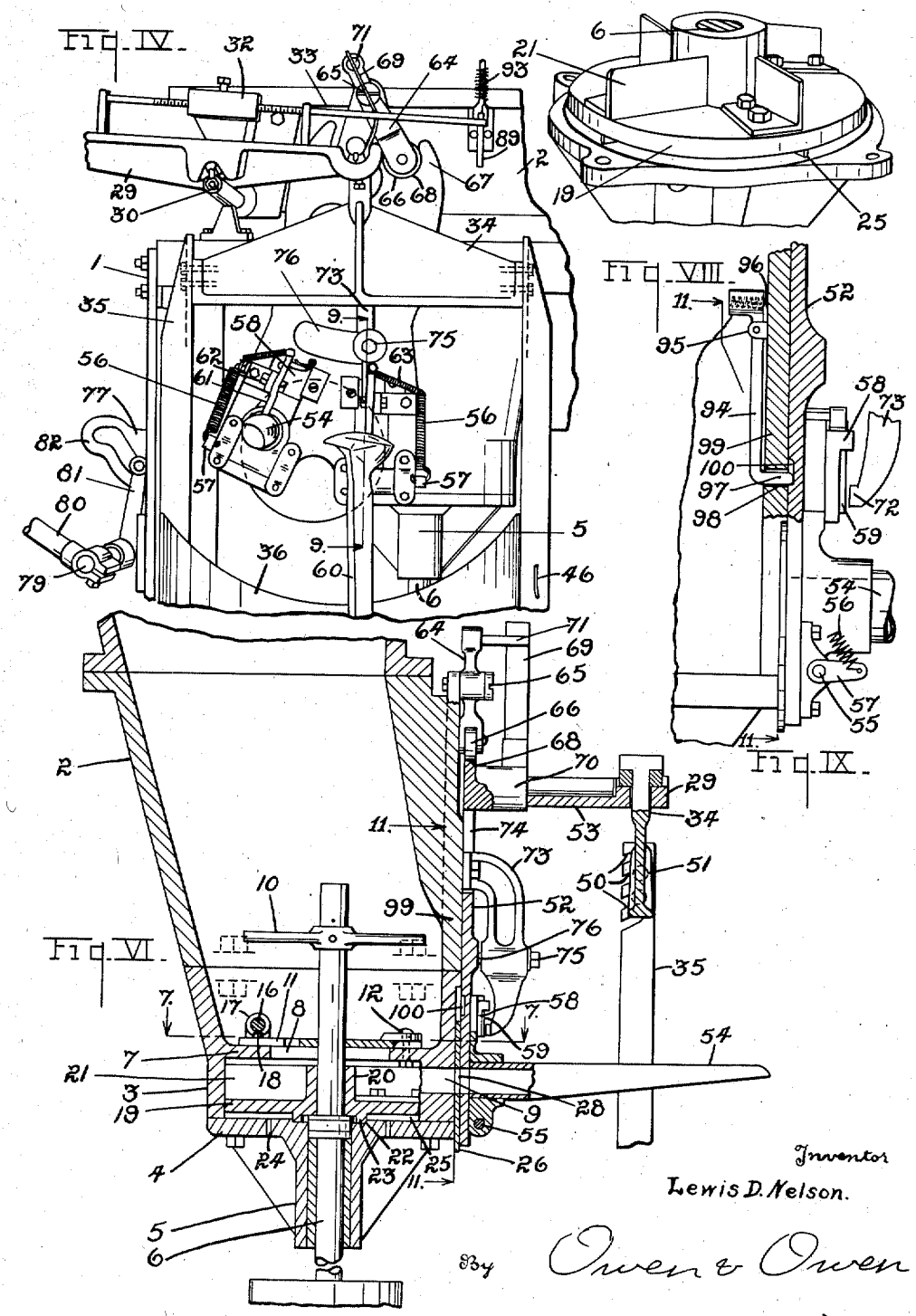
Inventor
Lewis D. Nelson.
By Owen & Owen
Attorneys.

June 4, 1929. L. D. NELSON Re. 17,316
FILLING MACHINE
Original Filed March 20, 1924 6 Sheets-Sheet 5
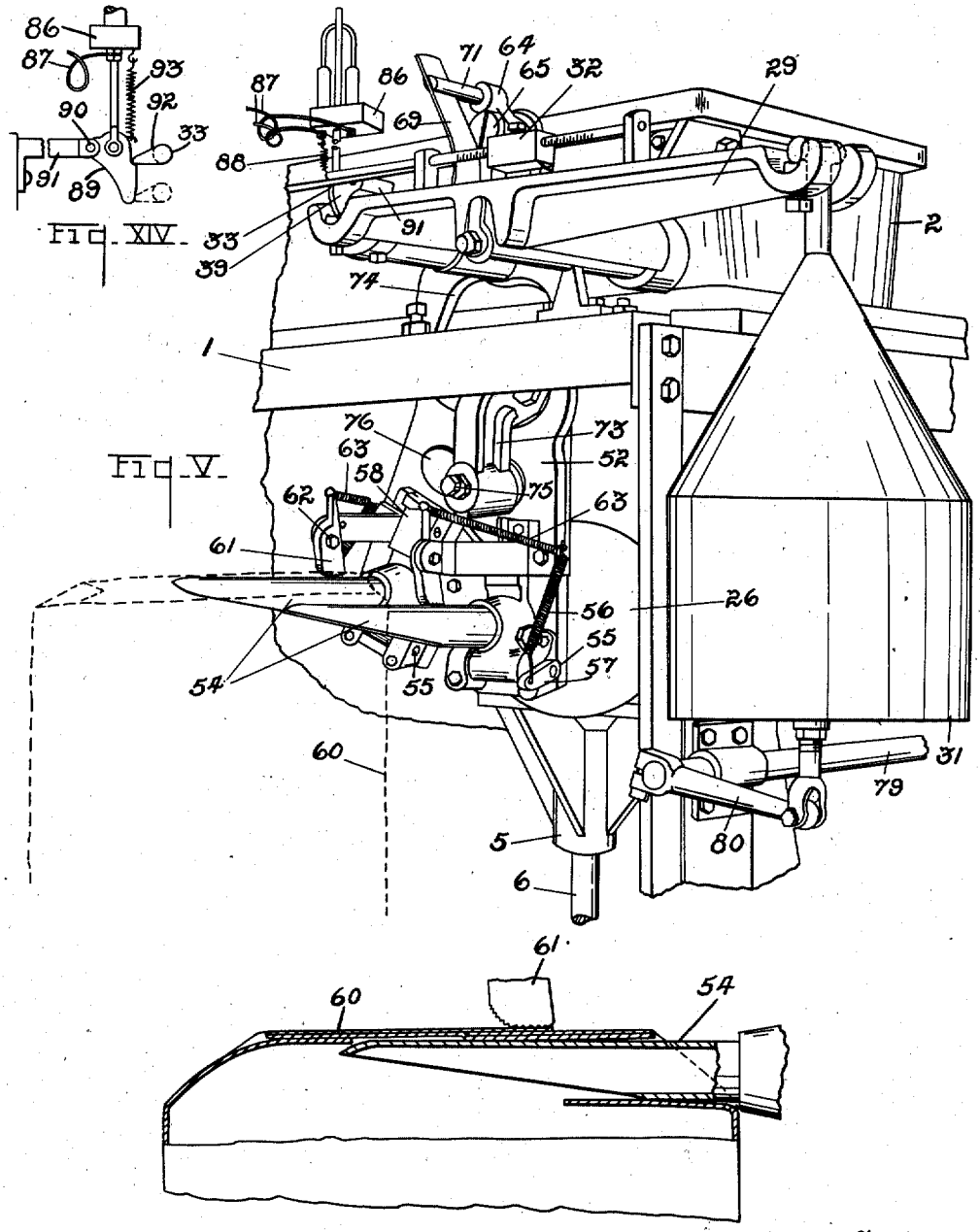
Fig. V.
Fig. X.
Inventor
Lewis D. Nelson.
By Owen & Owen
Attorneys.

June 4, 1929. L. D. NELSON Re. 17,316
FILLING MACHINE
Original Filed March 20, 1924 6 Sheets-Sheet 6
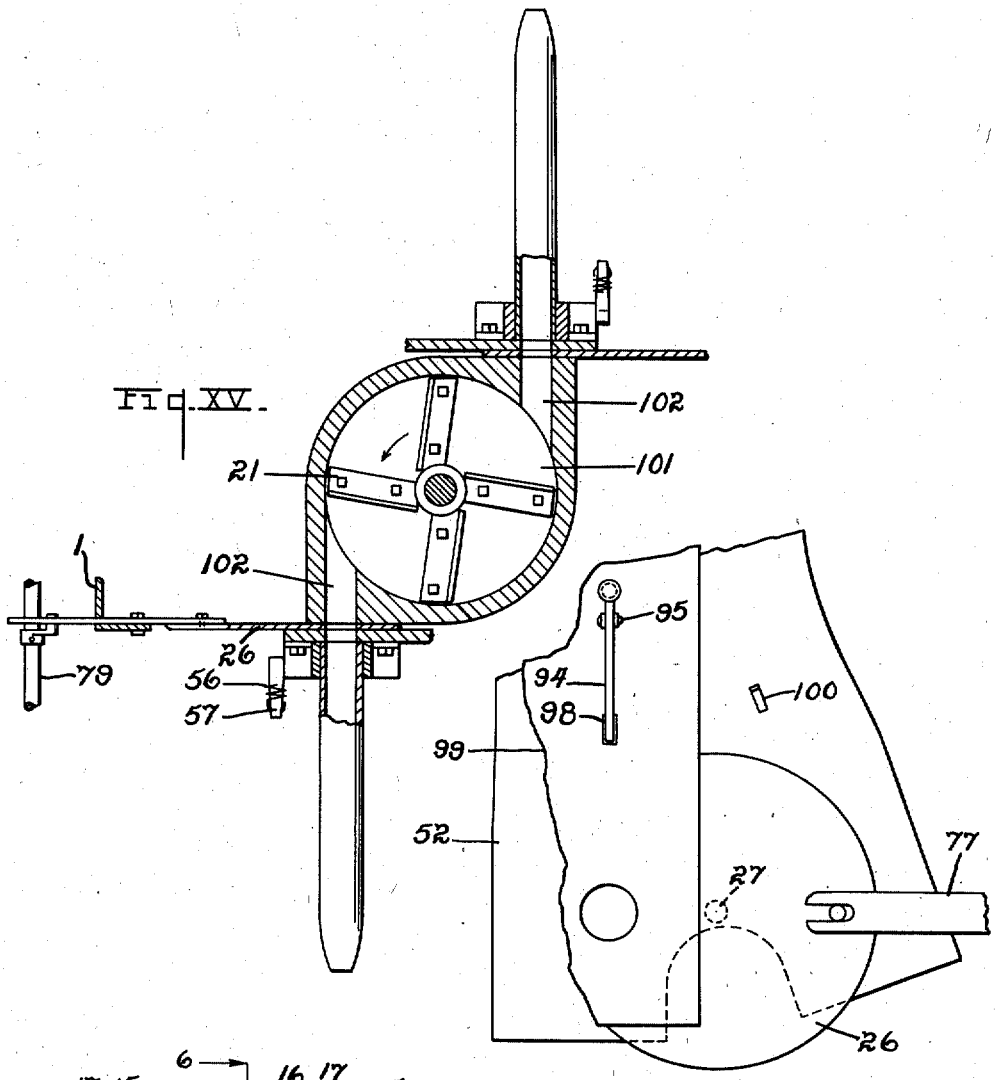
Fig. XV.
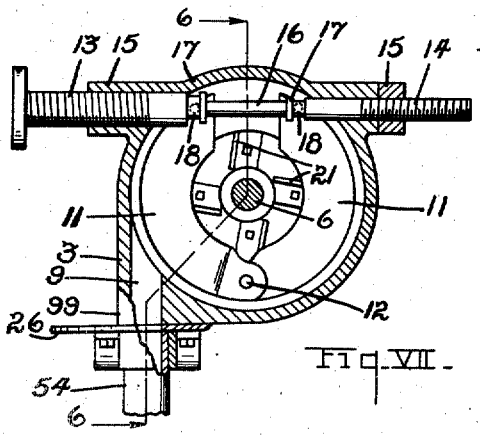
Fig. XI.
Fig. VII.
Inventor
Lewis D. Nelson.
By Owen & Owen
Attorneys.

Reissued June 4, 1929.

Re. 17,316

UNITED STATES PATENT OFFICE.

LEWIS D. NELSON, OF COLDWATER, MICHIGAN, ASSIGNOR TO BATES VALVE BAG CORPORATION, OF CHICAGO, ILLINOIS, A CORPORATION OF DELAWARE.

FILLING MACHINE.

Original No. 1,628,267, dated May 10, 1927, Serial No. 700,566, filed March 20, 1924. Application for reissue filed April 10, 1929. Serial No. 354,119.

This invention relates to improvements in filling machines.

My improvements are especially designed by me for filling bags with cement, lime or other materials and I have illustrated the same as I have embodied them in a bag filling machine for the handling of cement. My improvements are, however, desirable and readily adapted for handling other materials.

The main objects of this invention are:

First, to provide an improved bag filling machine which is automatic in its operation, it only being required that the operator shall place the bags in position.

Second, to provide an improved filling machine which is of very large capacity.

Third, to provide an improved filling machine for filling bags with cement or non-fluid materials which is not likely to become clogged.

Fourth, to provide an improved filling machine in which the material is accurately weighed.

Fifth, to provide an improved filling machine having these advantages which is comparatively simple and is very durable in structure.

Objects pertaining to details and economies of construction and operation of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. 1 is a fragmentary front elevation of a filling machine embodying the features of my invention, the upper part of the hopper and the lower part of the supporting frame being broken away, the machine illustrated being a double unit machine; Fig. 2 is a fragmentary end elevation from the left of Fig. 1; Fig. 3 is a fragmentary front elevation showing the parts in another position, the mechanism having just reached its downward position and a filled bag having just been discharged; Fig. 4 is a fragmentary front elevation showing the parts in raised or initial position; Fig. 5 is a fragmentary perspective view showing further structural details; Fig. 6 is a detail vertical section on a line corresponding to line 6—6 of Figs. 3 and 7; Fig. 7 is a detail horizontal section on a line corresponding to line 7—7 of Fig. 6; Fig. 8 is a fragmentary perspective view of the feeder or ejector; Fig. 9 is a detail vertical section on a line corresponding to line 9—9 of Fig. 4, showing details of the locking means for holding a carrier in its actuated positions and for locking the spout in erected position, and also releasing the locking means; Fig. 10 is a detail view partially in section showing a bag in engagement with the spout and the relation of the bag holder thereto; Fig. 11 is a fragmentary view on a line corresponding to line 11—11 of Figs. 6 and 9 showing further details of the carrier locking means and of the valve and its operating connections; Fig. 12 is a fragmentary side elevation showing details of the platform support; Fig. 13 is a fragmentary view showing details of the carrier actuating means; Fig. 14 is a detail view showing details of the switch control means; Fig. 15 is a fragmentary view partially in horizontal section showing a modified form of my invention in which the ejector is provided with two spouts.

In the drawing the sectional views are taken looking in the direction of the little arrows at the ends of the section lines and similar numerals of reference refer to similar parts throughout the several views.

Referring to the drawing, I provide a supporting frame designated generally by the numeral 1. The details of this frame form no part of this invention, it being understood that it is of such character as to suitably support the operating parts. The structure shown in Fig. 1 is a double unit machine but as the units are duplicates a description of one will suffice.

The material is supplied to the hopper 2 by any suitable means. At the bottom of the hopper is an ejector cylinder 3 having an approximately vertical axis and a removable bottom 4 carrying a bearing 5 for the shaft 6 which is driven from any suitable source of power. The cylinder 3 has a top 7 provided with a central opening 8. The cylinder has a discharge opening 9 which is tangentially disposed relative to the cylinder, see Fig. 7.

The shaft 6 projects through the opening 8 into the hopper 2 and is provided with radial arms 10 providing an agitator within the hopper and preventing the material from becoming wedged or banked in the hopper and loosening it so that it feeds through the opening 8 into the ejector cylinder.

The cylinder is provided with a valve comprising a pair of segmental valve members 11 pivoted at 12 and simultaneously operated by the right and left hand screws 13 and 14 coacting with nuts 15 and connected by the rod 16. This rod has collars 17 engaging the upwardly projecting pins 18 on the valve members so that they are simultaneously adjusted as seated maintaining a central inlet to the ejector chamber.

The ejector comprises a disk-like body member 19 of such diameter that its edges are in close proximity to the walls of the cylinder. This body member lies in a plane below the discharge opening 9 and has an upwardly projecting hub 20 as shown in Fig. 6.

Blades 21 are secured upon the face of this disk-like body member in a rearwardly inclined relation, preferably tangentially of the hub as shown in the drawings. I have found in practice that with the blades thus disposed the material is rapidly ejected through the discharge opening and the tendency for the material to pack and thereby clog the machine is minimized.

The bottom of the cylinder has a central cylindrical recess 22 while the ejector has an annular flange 23 traveling in this recess which is effective in preventing the material from reaching the bearing.

Further, to prevent clogging and to prevent the material from reaching the bearing, I provide the bottom with a discharge vent 24 positioned at the side of this flange 23 and the ejector with the clearing blades 25 disposed radially on the under side of the ejector. These clearing blades to a large extent prevent the material passing below the ejector. With the parts thus arranged I am able to discharge large quantities of heavy powdery material such as cement and lime with very little likelihood of clogging, which is a feature of very great advantage.

The discharge 9 is provided with a disk valve 26 pivoted at 27 and having an opening 28 therein adapted to be brought into and out of register with the discharge opening 9. This valve is automatically operated by means which will be hereinafter described.

The machine is controlled by a weighing mechanism which in the structure illustrated comprises the scale beam 29 pivoted at 30 and provided with a weight 31 and also provided with an auxiliary weight 32 for accuracy in adjustment, the auxiliary weight being carried by the scale rod 33 mounted on the scale beam.

Suspended from the scale beam is a platform carrying frame comprising the head piece 34, the uprights 35 and the back wall 36, this back wall being curved as shown. The platform 37 is pivoted at its rear edge as at 38 so that its forward end may swing downwardly as shown by dotted lines in Fig. 12. The platform is held in its raised position by means of the latches 39 and 40 mounted on the pivots 41 and provided with springs 42 by means of which the latches are urged to engaging position.

On the under side of the platform is a transversely disposed rod 43 having keepers 44 and 45 with which the latches 40 and 39 engage when the platform is in its raised position. Springs 46 are connected to the frame and to the platform for returning the platform to its raised position after a filled bag has been discharged. When the platform frame moves downwardly the latch 40 comes into engagement with the tripping lug 47 on the adjustable supporting plate 48, see Fig. 2, thereby disengaging the latch 40 allowing the platform to drop. The supporting rod 43 is supported for limited rotative movement thereby permitting it to become disengaged from the latch 39. The spring 49 returns the rod so that its keepers shall be in proper position to be engaged by the latches. The side members or uprights 35 of the platform frame are adjustably connected to the headpiece 34, the side pieces having a series of notches 50 which may be selectively engaged with the pins 51 on the ends of the headpiece (see Fig. 6).

The scale beam also carries a spout carrier 52 which is pivoted on the inwardly projecting arm 53 of the scale beam. This carrier overlaps or overhangs the valve 26 and is provided with a pair of spouts 54 which are mounted on pivots 55 so that they may swing downwardly to discharge the filled bags. These spouts are returned to their raised position by means of the spring 56 connected to the carrier at one end and to the arms 57 on the pivots 55.

The sliding latches 58 are mounted on the spout carrier by means of the slideways 59 to engage the bases of the spouts when the spouts are in raised position, see Fig. 9. As the carrier is oscillated the spouts are alternately brought into register with the discharge opening 9.

The bags 60 are of the self-closing type and are especially designed to receive the spouts. The bags are retained upon the spouts by means of the bag holders 61 pivoted at 62 and held yieldingly in engaging position by means of the spring 63, see Figs. 5 and 10. The operator pushes the bag under the bag holders which have serrated faces and are of such length that the pull thereon tends to make the jaw grip the bag more firmly. When, however, the latch 58 is released, the spout drops downwardly thereby releasing the bag and this is timed with the releasing of the platform so that the filled bag is ejected. The operator places a bag on the spout which is in non-filling position while the other spout is in filling position so that as soon as the bag is discharged the spouts are automatically shifted.

The spout carrier is automatically shifted or oscillated by means of the carrier actuating lever 64 which is pivoted on the frame at 65 and provided with a roller 66 engaging the yoke 67 formed in the upper end of the spout carrier, this yoke providing a pair of seats 68 on the opposite sides of the pivot of the yoke. The lever is actuated by the spring 69, one end of which is connected to the hub 70 of the carrier, see Fig. 6, and the other end is connected to a pin 71 projecting from the upper end of the lever. When the scale beam is in its initial position this actuating spring is placed under stress as will be clear from Figs. 1 and 4 of the drawing, so that when the bag carrier is lowered by the lowering of the scale beam under load the lever is swung to the opposite end of the yoke, thereby actuating the spout carrier, this taking place as soon as the filled bag is discharged.

This downward movement of the carrier also brings the latch 58 into engagement with the trip 72 on the end of the supporting bracket 73 which is mounted on the frame to project through an opening 74 in the carrier, see Figs. 6 and 9. This bracket 73 also serves as a means for slidably supporting the carrier, the bracket having an adjustable screw 75 with which the boss 76 slidably engages. The latches 58 are alternately brought into coacting relation with the trip 72.

To time the actuation of the valve with the other parts, the valve actuating lever 77 which is pivoted at 78 is operated from a rock shaft 79 having an arm 80 thereon connected to the weight 31, the rockshaft having an arm 81 engaging the cam slot 82 in the lever 77 so that when the weight moves upwardly under the load on the scale beam as shown in Fig. 3, the arm moves downwardly in the cam slot 82 actuating the lever 77 to close the valve.

To accelerate or cause a quick action of the parts thereby closing the valve quickly and also causing quick movement of the connected parts, I provide an electromagnet 83, the armature of which, not illustrated, is connected by the rod 84 to an arm 85 on the rockshaft 79. This electromagnet is in turn controlled from a switch designated generally by the numeral 86 connected by the wires 87 to the armature. The switch illustrated is of the mercury type, it, however, being shown conventionally.

The switch actuating rod 88 is pivotally connected to the lever 89 pivoted at 90 on the projecting bracket 91. The scale rod 33 is provided with a tappet 92 adapted to engage this lever on the down stroke of the rod or when the scale beam is actuated by the weight thereon, thereby closing the switch and actuating the electromagnet, as stated, to accelerate the movement of the parts.

A coiled spring 93 yieldingly supports the trip lever 89 and allows the tappet to return to its initial position, see Fig. 14.

To lock the carrier in its actuated position I provide a locking dog 94 which is pivoted at 95 and is held yieldingly in engaging position by the spring 96, the engaging end 97 of the dog being arranged through a hole 98 in the frame piece 99 to engage one of the recess-like keepers 100 in the carrier, see Figs. 9 and 11. As the carrier moves downwardly this locking dog is disengaged, the upper end of the keeper being inclined so that the dog is pushed rearwardly, thereby releasing the carrier for its oscillating movement.

These various operations are timed so that all the operator is required to do is to place the bags on the spouts. As soon as the required weight of material has been discharged into the bag, the weight of the bag actuates the scale thereby disengaging the spout supporting latch, and, also, when a predetermined point is reached the platform is released so that the bag is ejected. When the parts reach their lower position the actuating spring under the power stored therein actuates the lever 64 and shifts the carrier. On the return movement the spring is again placed under stress or power stored therein, and the lever engaging one of the seats 68 locks the carrier in position.

I have described the means for accelerating the movement of the parts. In the modification shown in Fig. 15 the cylinder 101 is provided with two discharge openings 102 so that each cylinder supplies two mechanisms These mechanisms are the same as previously described.

Fig. 15 clearly shows that the rotor is mounted concentrically with its cylindrical casing, and the rotor blades extend to close proximity with the casing wall, a construction found advantageous, in discharging powdery or granular materials, over a casing with a wall gradually receding from the path of the blades as they approach the outlet, as is common in centrifugal pumps for fluids.

I have illustrated and described my improvements in an embodiment which I have found very efficient and of very large capacity. As stated, I have illustrated my improvements as embodied in a machine for handling cement. I have not attempted to illustrate or describe various adaptations or embodiments which I contemplate as I believe this disclosure will enable those skilled in the art to embody or adapt my invention as may be desired.

Having thus described my invention, what I claim as new and desire to secure by Letters Patent is:

1. In a structure of the class described, the combination of a vertically disposed cylinder having an inlet opening at the top, a valve for said inlet opening, a disc-like rotor having an annular flange on its underside, the bottom of said cylinder having an annular recess adapted to receive said flange and having vents positioned at the outside of said flange, the diameter of said rotor being such that its edges are in close proximity to the walls of the cylinder, blades disposed on the upper side of said rotor in a rearwardly inclined relation, said cylinder having a tangentially disposed discharge opening in the horizontal plane of said blades, and clearing blades mounted on the underside of said rotor.

2. In a structure of the class described, the combination of a vertically disposed cylinder having a central inlet opening at the top and a peripheral discharge opening, a rotor having an annular flange on its underside, the bottom of said cylinder having an annular recess adapted to receive said flange and having vents positioned at the outside of said flange, the diameter of said rotor being such that its edges are in close proximity to the walls of the cylinder, ejector blades on the upper side of said rotor, and clearing blades on the underside thereof.

3. In a structure of the class described, the combination of a vertically disposed cylinder having a central inlet opening at the top, an adjusting valve for said opening comprising opposed segmental members, means for simultaneously adjusting said valve members whereby the feed to the cylinder is maintained centrally thereof, and a rotor comprising a web having ejector blades on its upper side, said blades being disposed in a rearwardly inclined relation and said cylinder having a tangentially disposed discharge opening in the horizontal plane of said blades.

4. In a structure of the class described, the combination of a vertically disposed cylinder having a central inlet opening at the top, an adjusting valve for said opening comprising opposed segmental members, means for simultaneously adjusting said valve members whereby the feed to the cylinder is maintained centrally thereof, and a rotor comprising a web having ejector blades on its upper side, said cylinder having a discharge opening in the horizontal plane of said blades.

5. In a structure of the class described, the combination of a vertically disposed cylinder having a central inlet opening at the top, an adjusting valve for said inlet opening, and a rotor comprising a web having ejector blades on the top thereof disposed in a rearwardly inclined relation, said cylinder having a tangentially disposed discharge opening in the horizontal plane of said blades.

6. In a structure of the class described, the combination of a vertically disposed cylinder having a central inlet opening at the top, and a disc-like rotor provided with ejector blades on the top thereof disposed in a rearwardly inclined relation, and clearing blades on the underside thereof, said cylinder having a tangentially disposed discharge opening in the horizontal plane of said ejector blades and vent openings in its bottom.

7. In a structure of the class described, the combination of a vertically disposed cylinder having a central inlet opening at the top, a side discharge opening, and vent openings in its bottom, a rotor comprising a web of such diameter that its edges are close to the walls of the cylinder, and ejector blades on the top of said web and clearing blades on the underside thereof.

8. In a structure of the class described, the combination of a vertically disposed cylinder having an inlet opening at the top, and a rotor comprising a web having ejector blades on its upper side disposed in a rearwardly inclined relation and clearing blades on its underside, said cylinder having a side discharge opening and vent openings in its bottom.

9. In a structure of the class described, the combination of a vertically disposed cylinder having an inlet opening at the top, and a rotor comprising a web having ejector blades on its upper side and clearing blades on its underside, said cylinder having a side discharge opening and vent openings on its bottom.

10. In a structure of the class described, the combination of vertically disposed cylinder having a central valved inlet opening at the top and a peripheral discharge opening, and a rotor comprising a web having ejector blades on its upper side.

11. In a structure of the class described, the combination of a vertically disposed cylinder having a central inlet opening at the top and a peripheral discharge opening, and a rotor comprising a web having ejector blades on its upper side.

12. In a structure of the class described, a vertically disposed cylinder having a top with a central opening and having a peripheral discharge opening and a rotor within the cylinder and concentric therewith, said rotor comprising a bottom disc and blades between said disc and said top and extending into close proximity to the walls of the cylinder.

13. In a structure of the class described, a casing and a rotor within the casing, said rotor comprising a disc rotating in a substantially horizontal plane and ejector blades above the disc, the casing having an inlet opening above the middle portion of said rotor and a peripheral discharge opening in the horizontal plane of said blades, the wall of the casing being in close proximity to the path of the outer ends of the blades where they approach said discharge opening.

14. In a structure of the class described, a casing and a rotor within the casing, the rotor comprising ejector blades and a disc at one side of said blades, and the casing comprising an annular wall on the other side of said blades from said disc and a cylindrical wall co-axial with said rotor and having a peripheral discharge opening in the radial plane of said blades.

15. In a structure of the class described, a cylinder having an inlet opening in one end and a peripheral discharge opening, and a rotor within the cylinder, said rotor comprising a disc in the end of the cylinder opposite said inlet opening and ejector blades rotatable with the disc, in the radial plane of said discharge opening, and extending into close proximity with the wall of the cylinder.

16. In a structure of the class described, a casing and a rotor within the casing, said casing having an inlet opening in one end and a peripheral discharge opening and said rotor comprising a disc in a radial plane on the side of said discharge opening away from the inlet opening and ejector blades in the radial plane of the discharge opening and extending into close proximity to the wall of the casing where they approach said opening.

17. In a structure of the class described, the combination of a hopper, a cylinder disposed vertically below said hopper and having a central inlet opening communicating therewith, an adjusting valve for said inlet opening, a rotor shaft disposed vertically through said cylinder and projecting into said hopper, a disc-like rotor, blades on the top of said rotor disposed in a rearwardly inclined relation, said cylinder having a tangentially disposed discharge opening in the horizontal plane of said blades and vent openings in its bottom, clearing blades on the underside of said rotor, and agitator blades on said shaft within said hopper.

18. In a structure of the class described, the combination of a hopper, a cylinder disposed vertically below said hopper and communicating therewith, a rotor shaft disposed vertically through said cylinder and projecting into said hopper, a disc-like rotor, blades on the top of said rotor disposed in a rearwardly inclined relation, said cylinder having a tangentially disposed discharge opening in the horizontal plane of said blades and vent openings in its bottom, clearing blades on the underside of said rotor, and agitator blades on said shaft within said hopper.

19. In a structure of the class described, the combination of a hopper, a cylinder disposed vertically below said hopper and having a central inlet opening, a rotor shaft disposed vertically through said cylinder and projecting into said hopper, a rotor comprising a web-like body having ejector blades disposed on the upper side thereof and clearing blades on its underside, said cylinder having a discharge opening in the horizontal plane of said ejector blades and vent openings in its bottom, and an agitator on said shaft within said hopper.

20. In a structure of the class described, the combination of a hopper, a cylinder disposed vertically below said hopper and having a central inlet opening, a rotor shaft disposed vertically through said cylinder and projecting into said hopper, a rotor comprising a web-like body having ejector blades disposed on the upper side thereof, said cylinder having a discharge opening in the horizontal plane of said ejector blades, and an agitator on said shaft within said hopper.

In witness whereof I have hereunto set my hand.

LEWIS D. NELSON.

CERTIFICATE OF CORRECTION.

Reissue Patent No. 17,316. Granted June 4, 1929, to

LEWIS D. NELSON.

It is hereby certified that the above numbered patent was erroneously issued to "Bates Valve Bag Corporation, of Chicago, Illinois, a Corporation of Delaware", whereas said patent should have been issued to "St. Regis Paper Company, of New York, N. Y., a Corporation of New York", said corporation being assignee by mesne assignments, of the entire interest in said invention, as shown by the records of assignments in this office; and that the said Letters Patent should be read with this correction therein that the same may conform to the record of the case in the Patent Office.

Signed and sealed this 30th day of July, A. D. 1929.

M. J. Moore,
Acting Commissioner of Patents.

(Seal)